INVENTOR.
PAUL A. DEMARS

ATTORNEY

Patented Jan. 16, 1951

2,538,444

UNITED STATES PATENT OFFICE 2,538,444

SONIC SYSTEM FOR MEASURING FILAMENTS

Paul A. de Mars, Washington, D. C., assignor to Raymond M. Wilmotte, Inc., Washington, D. C.

Application February 3, 1949, Serial No. 74,457

13 Claims. (Cl. 181—.5)

The present invention relates generally to methods and apparatus for measuring the average cross-sectional area of lengths of filaments, yarns, strips, wires, rods, threads, and the like, hereinafter sometimes referred to as elongated members, and more particularly to methods and apparatus of this character by determining the attenuation of sonic energy introduced by the presence of the elongated member in a sound conducting passage.

Various system have been devised for measuring the diameter, or the thickness, of threads, wires, filaments, strips, and elongated members generally, while the latter are in process of moving, for example, during a manufacturing process. Such methods do not, in general, however, provide a determination of average cross-sectional area as distinguished from a thickness in one or more dimensions. Many such systems are known which operate by measuring the total blockage of light introduced by the object which is the subject of measurement, and while such systems are relatively sensitive they are normally relatively expensive to build and difficult to adjust, and furthermore, they fail to provide a measurement of average cross-sections as distinguished from thickness or diameter of the object being measured. Optical methods, furthermore, fall down completely when the object being measured is translucent, or transparent, or capable of transmitting light to some extent. Accordingly, systems of this character are not suitable for measuring the average thickness or cross-sectional areas of yarn or similar diffuse filaments which are capable, at some stages of their manufacture, of transmitting some light.

Various methods and system are known for measuring the dimension of a traveling filament, wire, thread, strip or the like by mechanical means, that is, by means of feelers which are continually in contact with the object subject to measurement. Systems of this character are not suitable for measuring certain types of objects which are extremely soft, such as yarn, threads, and the like, since these are deformed by the act of measuring.

It frequently occurs, in the course of manufacturing operations upon filaments, threads, yarns, and the like, that defects occur which take the form of discrete irregularities in cross-section or volume per unit length. Such imperfections, when they occur in the manufacture of yarn, are commonly called "slubs," and may occur at any point in the processing of the yarn following the carding operation. The typical "slub" in yarn consists of a short section of the yarn, which may extend from a fraction of an inch to several inches, and in which the volume of material is considerably greater than normal and appears as a bunch or thick portion. It is well known in the industry that if "slubs" are not removed from the yarn, there will result a poor and defective fabric when the yarn is woven.

Many attempts have been made to devise apparatus for detecting "slubs" during the various drafting, spinning and winding operations which may be performed on yarn, so that the "slubs" may be eliminated before the yarn is woven. The nature of woolen and worsted fibers, however, is such that, in the various processes of manufacture, the detection of "slubs" is extremely difficult of accomplishment, and devices presently in use are not as reliable as is desired. The primary reason for the difficulty lies in the extreme softness of yarn, which renders it unsuitable for any mechanical "feeling-out" operation, the "slubs" giving in response to any but the very slightest mechanical pressure.

It is an object of the present invention to provide a method and apparatus for measuring non-mechanically the average cross-sectional area, or the true thickness of threads, wires, strips, filaments, yarn, and the like, and of elongated members generally.

It is a further object of the invention to provide a novel system for measuring the average cross-sectional or the presence of discrete variations of cross-sectional area, of a length of material.

It is a further object of the invention to provide a novel system and method for measuring the average cross-sectional area, or the presence of discrete variations of cross-sectional area, of a length of material, utilizing acoustic principles.

More specifically, it is an object of the present invention to provide apparatus and a method for testing the cross-sectional properties of lengths of an elongated object, such as thread, wire, yarn, strip, filament, or the like, by determining the attenuation produced by the presence of the object in a hollow tube or pipe through which sonic vibrations are caused to travel.

Briefly described, apparatus constructed in accordance with the present invention employs a pair of sound chambers which are inter-connected by a relatively elongated tube of relatively narrow cross-section, suitable for traverse axially therethrough of an elongated object, variations in the cross-sectional area of which is to be determined, and which may be in continuous motion axially. The sound chambers may be provided with narrow apertures aligned with the tube, to enable introduction of the elongated object, as well as removal thereof, from the testing device. Sonic energy is introduced into one of the chambers in any convenient manner, as by means of a loud speaker which is energized at a fixed single frequency by means of any suitable source of electrical energy, such as an electronic oscillator. Sonic energy which passes through the elongated connecting tube is detected by means of a microphone, or other suitable analogous device, which produces at its output an electrical signal having an amplitude proportional to the energy of the sonic wave applied thereto.

The attenuation in sonic energy introduced in traverse of the elongated tube may be measured in various ways, by apparatus of many different characters. This attenuation will be a direct function of the average thickness or average cross-sectional area, of that portion of the elongated object being tested which is momentarily within the elongated tube, or a function of the presence of a discrete discontinuity or variation in cross-sectional area of the elongated object.

The methods and systems which I prefer to employ for determining the attenuation of sonic energy occurring during traverse of the energy through the elongated tube, in general, correspond with comparison methods and systems. In accordance with one such method and system I derive energy from the oscillator which drives the source of sonic energy, and rectify output of the oscillator to derive a D. C. voltage corresponding in amplitude with the magnitude of the oscillator output, and consequently with the magnitude of the sonic output of the sonic source. Similarly I rectify the output of the microphone pick-up, to provide a D. C. voltage corresponding with the magnitude of the sonic energy picked up by the microphone. The two D. C. voltages may then be compared by means of a simple volt meter with suitable sensitivity which may be adjusted in known ways to provide a zero or other predetermined reading when the object being measured possesses standard average cross-sectional area, and no discrete defects, deviation of the pointer of the instrument from zero then representing deviation of average cross-sectional area from the standard or the presence of discrete defects.

In accordance with a modification of the above described system, the output of the oscillator is rectified, and the rectified voltage utilized as an automatic gain control voltage for an amplifier which amplifies the output of the microphone. The output of the latter amplifier may be measured by means of a suitable indicating instrument, and the reading of the instrument is continuously corrected for variations of sonic input energy in response to the automatic gain control voltage, which is proportional to the amplitude of output of the sonic source.

In accordance with still a further modification of the invention, I employ a pair of microphones, one adjacent to the input to the elongated sonic tube and the other located adjacent to its output. Comparison is effected, by means of a simple bridge circuit, of the output of the two microphones. The last mentioned system possesses the advantage that no electronic amplifiers or rectifiers are required in its operation, since a sufficiently sensitive meter is capable of measuring the output of the microphones directly.

The above and still further objects, features and advantages of the present invention will become evident upon consideration of the following detailed description of various modifications thereof, especially when taken in conjunction with the accompanying drawings, wherein.

Figure 1:
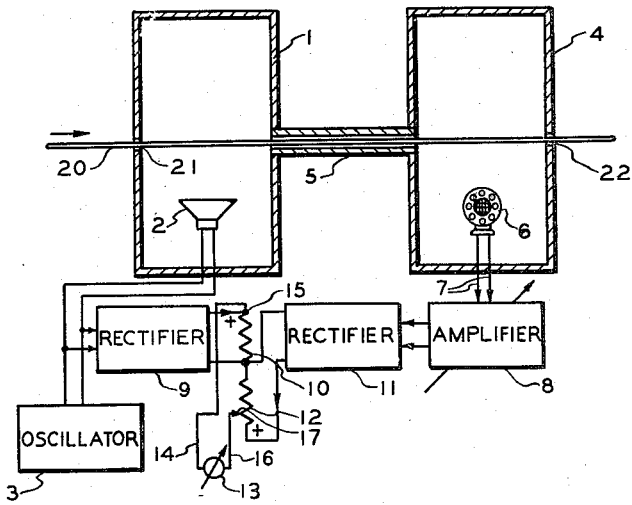
Figure 1 illustrates, in longitudinal cross-section, a pair of sound chambers and an interconnecting hollow tube, and in functional block diagram, the various circuit elements associated therewith, in accordance with the present invention.

Referring now more specifically to the drawings, the reference numeral 1 illustrates a first sound chamber which, for the purposes of the present invention, may or may not be resonant to the frequency of the sonic energy radiated internally thereof by means of a loud speaker 2, or other equivalent source of sonic energy, the speaker 2 being driven by an electronic oscillator 3 at a predetermined signal frequency. A further sound chamber 4, is provided which is similar to the sound chamber 1, and which is interconnected therewith by means of a relatively long tube 5, so that sonic energy originating in the chamber 1 may travel to the chamber 4 via the tube 5. Located within the sound chamber 4 is a microphone 6, or some equivalent device capable of picking up sonic energy and translating the sonic energy into electrical energy. Electrical output of the microphone 6 is carried externally of the chamber 4 by means of leads 7, and amplified by means of an amplifier 8. The output of the oscillator 3 is rectified by means of a rectifier 9, the rectified output being suitably filtered and applied across an output resistor 10 as a D. C. voltage. The output of the amplifier 8 is similarly rectified by means of a rectifier 11, the D. C. output of which is applied across a resistor 12. The resistors 10 and 12 may be connected in series, the voltages appearing thereon being opposed. The volt meter 13 may be connected by means of a lead 14 to one terminal 15 of the resistor 10, and by means of a further lead 16 to a variable tap 17, slideable along the resistor 12. The circuit arrangement described enables comparison of the voltage appearing across the resistor 10 with any desired proportion of the voltage appearing across the resistor 12, the desired proportion being selected by positioning of the variable tap 17.

Should the oscillator 3 vary with respect to the amplitude of its output, this variation will be reflected in the sonic energy provided by the speaker 2, but will further be similarly reflected in the sonic energy picked up by the microphone 6. Accordingly, the reading of the meter 13 will be substantially independent of the output of the oscillator 5, at least for relatively small variations in such amplitude. Any increase in output from the rectifier 9 due to increase of output from the oscillator 5 generates a corresponding and opposing increase of voltage across the resistor 12, due to variation of sonic energy intercepted by the microphone 6. It may be realized, however, that the balance of effects, or the inherent compensation, is not perfect unless the attenuation occurring in the tube 5 is relatively slight. If, however, the attenuation is great the absolute value of change in sonic energy at the microphone 6 will not be substantially equal to the absolute change in magnitude of the sonic energy supplied by the microphone 2. Accordingly, the system of Figure 1 is only partially self-compensating with respect to large variations in amplitude of the output of the oscillator 3. Such large variations may, however, be readily avoided in practice.

For purposes of applying the mechanism described to the measurement of average cross-sectional area of thread, yarn, filament, wire, strips or the like, or to the detection of discrete variations of cross-section, in accordance with the objects of the present invention, the object is caused to enter the chamber one via an aperture 21, to pass through the tube 5, and then to pass outwardly of the chamber 4 via an aperture 22. Various means well known in the sonic art may be adopted to prevent escape of sonic energy through the aperture 21, since if such escape occurs and if the escaping sonic energy seeps through into the chamber 4 via the aperture 22, inaccuracies will be introduced in the system. Since the apertures 21 and 22 are oriented in opposite directions and shielded by the structure of the chambers 1 and 4, however, this possibility is relatively slight and special precautions may be found unnecessary in commercial constructions of the invention.

The presence of the filament 20 within the elongated tube 5 results in attenuation of the sonic energy passing through the tube 5, and the total attenuation which occurs is a function of the average cross-section of the object 20 existing within the tube 5, and of discrete variations of cross-section, such as "slub" in yarn, and is substantially independent of the position which the object 20 occupies within the tube 5. That is, if the object 20 were a strand of yarn, for example, it need not be positioned truly axially of the cross-section of the tube 5, and variations of its axial positions which are not accompanied by variations in average cross-sectional area, or the presence of a "slub," will not affect the sonic input to the microphone 6.

In the operation of the system described, in conjunction with the Figure 1 of the accompanying drawings, a strand of yarn, assuming the invention to be applied to the testing or measurements of yarn, may be passed through the tube 5 via the apertures 21 and 22, and, it being known that the strand is perfect and contains no "slubs" and is of the desired average cross-section, the variable contact 17 may be adjusted until the meter 13 reads zero. Thereafter the yarn 20 may be fed through the tube 5 continuously. Should a "slub" occur in the yarn, the "slub" introduces an increase of attenuation of sonic energy greater than that introduced by normal yarn, and, accordingly, sonic energy applied to the microphone 6 decreases, and the voltage present across the resistor 12 similarly decreases. The meter 13 which measures the difference between the voltage existing across the resistor 10 and the voltage existing across the selected portion of the resistor 12 will then provide a visual indication or reading representative of the presence of the "slub."

In similar manner, which is believed to be sufficiently obvious to require no further exposition in the present specification, objects other than yarn may be tested.

Figure 2:
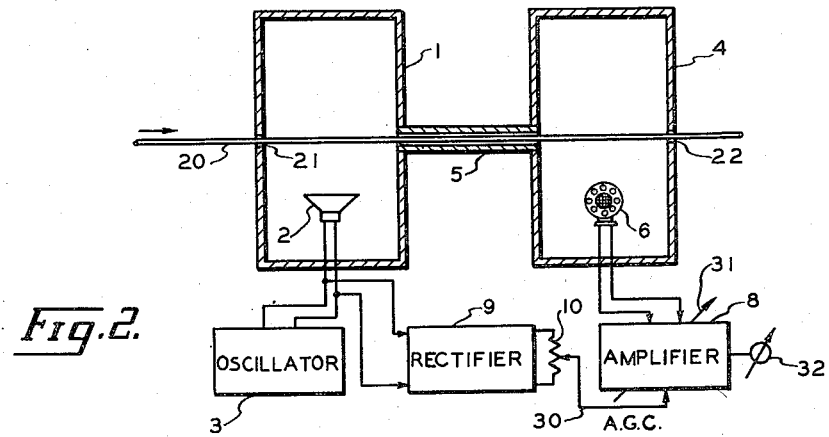
Figure 2 illustrates a modification of the system of Figure 1.

Reference is now made to Figure 2 of the accompanying drawing, which illustrates a modification of the system of Figure 1. In the system of Figure 2, the output of the rectifier 9 as developed across the resistor 10 is applied via the lead 30, as an automatic gain control voltage, to the amplifier 8, and serves to maintain the gain of the amplifier 8 inversely proportional to the amplitude of the output of the oscillator 5. The gain of the amplifier 8 may be varied manually by means of the control indicated conventionally by the arrow 31, to such a value that, in the presence of yarn having the desired characteristics, and free of "slubs," the meter 32 connected to the output of the amplifier 8 may read zero. Any variation in output of the oscillator 5 will be accompanied by an inversely directed variation in the gain of the amplifier 8, resulting in a constant reading of the meter 32 despite relatively large variations of output of the oscillator 5, so that the system is stabilized. Any variation of input to the amplifier 8 which occurs solely because of increased attenuation occurring in the tube 5, is reflected as a change of output of the amplifier 8, and consequently as a variation of reading of the visual indicator 32.

Figure 3:
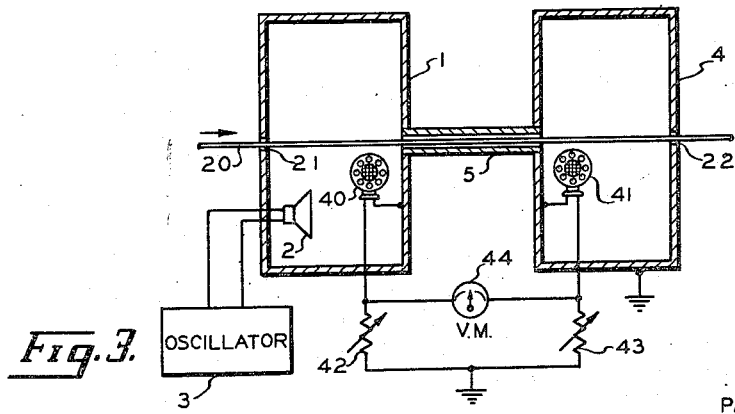
Figure 3 illustrates still a further modification of the system of Figure 1.

Reference is now made to Figure 3 of the accompanying drawings, which shows a further modification of the invention wherein is employed a microphone 40 in the sound chamber 1, and a further microphone 41 in the sound chamber 4. The output leads of the microphone 40 are connected one to ground, on the chamber 1, which may be fabricated of metal for this purpose, and the other across the resistance 42 to ground. The output of the microphone 41 is likewise grounded at one terminal, and at the other terminal connected across the resistance 43 to ground. Accordingly, the voltage output of the microphone 40 appears across the resistance 42 and the voltage output on the microphone 41 across the resistance 43. The resistances 42 and 43 may be variable, as indicated in the drawings, and across the ungrounded terminals thereof may be connected a differential volt meter 44 which measures the difference in voltages across the separate resistors. Variable resistors 42 and 43 may be adjusted while a standard segment of yarn 20 is located within the tube 25, to read zero, and, accordingly, an unbalance of the bridge comprising the microphones 40, 41 and the resistors 42, 43 will occur whenever the average cross-section of the yarn within the tube 5 varies from the normal. The output derivable from the microphone 40 and 41 may be more nearly comparable than are the outputs derivable from the oscillator 3 and from a single microphone, so that the system of Figure 3 may be more nearly balanced, with respect to variations of amplitude of output of the oscillator 3, than are the systems of Figures 1 and 2. In addition, the system of Figure 3 presents the advantage that no amplifiers or rectifiers are employed, which reduces the total cost of constructing the system, as well as the cost of servicing and maintaining the same.

While I have described and illustrated various embodiments of my invention, it will be clear that variations of details and of arrangements of the specific embodiments illustrated and described may be resorted to without departing from the true spirit and scope of the invention as defined in the accompanying claims.

What I claim and desire to secure by Letters Patent of the United States is:

1. In combination, in a system for testing the cross-section of a length of pliant filament, a source of sonic energy, a hollow tube having two ends and having no transverse dimension as great as any transverse dimension of said filament, said length of pliant filament located internally of said tube, means for impressing said sonic energy on one end of said tube, and means for measuring the attenuation of said sonic energy effected during passage of said sonic energy through said tube by virtue of the presence of said pliant filament therein.

2. In combination, in a system for measuring the average cross-section of a length of elongated member, a source of sonic energy, a hollow tube having two ends, said length of elongated member located internally of said tube, means for impressing said sonic energy on one end of said tube, means for measuring the intensity of sonic energy emerging from the other end of said tube, and means for continuously comparing said energies to determine the attenuation of said sonic energy effected during passage of said sonic energy through said tube.

3. In combination, in a system for measuring the average cross-section of a length of elongated member, an electronic oscillator, means for converting the output of said oscillator into sonic energy, a hollow tube having two ends, said length of elongated member located internally of said tube, means for impressing said sonic energy on one end of said tube, means for measuring the level of sonic energy emerging from the other end of said tube, and means for continuously comparing said sonic energies as a measure of the attenuation of said first mentioned sonic energy during passage of said first mentioned sonic energy through said tube.

4. In combination, in a system for testing the cross-section of a length of moving elongated member, an electrical signal source, means for translating said electrical signal into sonic energy, a hollow tube having two ends, said length of moving elongated member co-extensive with and internally of said tube, means for impressing said sonic energy on one end of said tube, whereby said sonic energy passes through said tube, means for converting sonic energy emerging from the remaining end of said tube into a further electrical signal, and means for measuring the amplitude of said further electrical signal.

5. In combination, in a system for testing the cross-section of a length of elongated member, a signal source, means for translating said signal into sonic energy, a hollow tube having two ends, said length of elongated member co-extensive with and internally of said tube, means for impressing said sonic energy on one end of said tube, whereby said sonic energy passes through said tube, means for converting sonic energy emerging from the remaining end of said tube into a further signal, means for measuring the amplitude of said further signal, and means for compensating the said amplitude for variations of amplitude of said first mentioned signal.

6. In combination, in a system for testing the cross-section of a length of elongated member, an electrical signal source, means for translating said electrical signal into sonic energy, a hollow tube having two ends, said length of elongated member co-extensive with and internally of said tube, means for impressing said sonic energy on one end of said tube, whereby said sonic energy passes through said tube, means for converting sonic energy emerging from the remaining end of said tube into a further electrical signal, means for amplifying said further electrical signal to provide an amplified signal, means for measuring the amplitude of said first mentioned signal, and means for controlling the gain of said amplifier in accordance with the amplitude of said first mentioned signal and in response to said last means.

7. In combination, in a system for testing the cross-section of a length of elongated member, a signal source, means for translating said signal into sonic energy, a hollow tube having two ends, said length of elongated member co-extensive with and internally of said tube and having no transverse dimension as great as any transverse dimension of said tube, means for impressing said sonic energy at one end of said tubes, whereby said sonic energy passes through said tube, means for measuring the intensity of sonic energy adjacent said one end of said tube, means for measuring the intensity of sonic signal adjacent the remaining end of said tube, and means for comparing the intensities of said sonic energy and said sonic signal as a measure of attenuation of said sonic energy in passing through said tube.

8. In combination, in a system for testing the cross-section of a length of elongated member, an electrical signal source, means for translating said electrical signal into sonic energy, a sound chamber, said means for translating said electrical signal into sonic energy located internally of said sound chamber, a second sound chamber, a hollow tube having two ends, one of said ends communicating with one of said sound chambers and the other of said ends communicating with the other of said sound chambers, said length of elongated member co-extensive with and internally of said tube, means for converting sonic energy in the other of said sound chambers to a further electrical signal, and means for measuring the amplitude of said further electrical signal.

9. In combination, in a system for comparing the cross-section of a length of standard elongated member to a corresponding length of sample elongated member, a signal source, means for translating said signal into sonic energy, a hollow tube having two ends, said hollow tube having no transverse dimension as small as any transverse dimension of either of said elongated members, means for impressing said sonic energy on one end of said tube, whereby said sonic energy passes through said tube, means for converting sonic signal emerging from the remaining end of said tube into a further signal, means for measuring the amplitude of said further signal, means for reducing the measurement of said amplitude of said further signal to a standard value in the presence of said standard elongated member internally of said tube, and means for measuring the deviation of said measurement in response to insertion of said sample elongated member internally of said tube as a measure of comparison of the cross-sections of said standard elongated member and said sample elongated member.

10. In combination, in a system for measuring the average cross-section of a length of elongated member, a signal source, a loud speaker for translating said signal into sonic energy, a hollow tube having two ends, said hollow tube having no inside transverse dimension as small as any transverse dimension of said elongated member, said length of elongated member co-extensive with and internally of said elongated hollow tube, means for impressing said sonic energy on one end of said tube, whereby said sonic energy passes through said tube, a microphone located adjacent the other end of said tube for converting sonic energy emerging from said last mentioned end of said tube into a further signal, and means for measuring the amplitude of said further signal as a measure of said average cross-section.

11. In combination, in a system for testing elongated members, a sonic signal source, a hollow tube having two ends, said length of elongated member co-extensive with and internally of said elongated hollow tube, means for impressing said sonic signal on one end of said hollow tube, means for measuring the intensities of sonic signal adjacent each end of said tube, and means comprising a bridge circuit for comparing said intensities.

12. In combination, in a system for testing yarn for the presence of slubs, a source of sonic energy, a hollow tube having two ends and of substantially uniform circular cross-section, said yarn passing internally of said tube and said tube having an internal diameter only slightly greater than the diameter of said yarn in the absence of slubs, means for impressing said sonic energy on one end of said tube, and means for measuring the attenuation of said sonic energy effected during passage of said sonic energy through said tube by virtue of the presence of said yarn therein.

13. The combination in accordance with claim 12 wherein said means for measuring attenuation comprises means for comparing sonic energy at the ends of said tube, respectively.

PAUL A. DE MARS.

REFERENCES CITED

The following references are of record in the file of this patent:

UNITED STATES PATENTS

| Number | Name | Date |
| --- | --- | --- |
| 1,795,647 | Flanders | Mar. 10, 1931 |
| 1,985,095 | Hoare | Dec. 18, 1934 |
| 2,043,984 | Alder | June 16, 1936 |
| 2,394,613 | Houlgate | Feb. 2, 1946 |
| 2,454,807 | Kennedy | Nov. 30, 1948 |